INVENTOR.
HENRY N. FAIRBANKS
BY Stanley Belsky
ATTORNEY

Aug. 23, 1966    H. N. FAIRBANKS    3,267,827
PROJECTION OFFSET PLATEMAKING CAMERAS AND THE LIKE
Filed Oct. 4, 1963    3 Sheets-Sheet 2

HENRY N. FAIRBANKS
INVENTOR.

BY Stanley Belsky

ATTORNEY

Aug. 23, 1966     H. N. FAIRBANKS     3,267,827
PROJECTION OFFSET PLATEMAKING CAMERAS AND THE LIKE
Filed Oct. 4, 1963     3 Sheets-Sheet 3

INVENTOR.
HENRY N. FAIRBANKS
BY Stanley Belsky
ATTORNEY

United States Patent Office 3,267,827
Patented August 23, 1966

3,267,827
PROJECTION OFFSET PLATEMAKING CAMERAS AND THE LIKE
Henry N. Fairbanks, Rochester, N.Y., assignor, by mesne assignments, to Itek Corporation, Lexington, Mass., a corporation of Delaware
Filed Oct. 4, 1963, Ser. No. 313,879
6 Claims. (Cl. 95—31)

The present invention is directed to improved sensitized sheet roll holders for cameras. More particularly the invention is directed to improvements in document copy and offset platemaking cameras and the like.

A typical automatic machine such as those which expose and process photographs automatically on a roll of photographically sensitized sheet material as shown in U.S. Patent No. 3,045,540, which is assigned to the assignee of this application. Cameras of the type disclosed therein use spooled sensitized paper. The spooled paper is large and bulky. In addition, the camera supply magazine is normally located several feet above the ground, requiring lifting of a heavy spool by the operator in order to load the camera. A typical loaded spool weighs in the order of 9 to 15 pounds and the spool support, in the camera, is in the order of 5 feet from the ground. The operator is, thereby, required to lift a heavy load several feet off the ground to load the camera. Furthermore, cameras of this type normally operate by pulling sensitized paper off the spool, rather than by driving the spools. It is necessary that the paper leave the spool along a straight path, to prevent lateral motion of the paper during its travel through the camera and the various processing stations usually associated with the camera. Lateral motion of the sheet during travel could cause jamming of the camera-processor. In order to insure straight travel, it is necessary that the spool rotate with its axis of rotation accurately aligned, i.e. horizontally. In the prior art, alignment of the spool is achieved by supporting it at its center on a pair of trunnions. In order to load, or unload, the camera, it is necessary to laterally move the trunnions to allow the spool to clear between the trunnions. After reloading the trunions have to be accurately repositioned to support the spools. It is necessary for the operator to hold, or otherwise support, the heavy spool several feet off the ground while he repositions the trunnions to support the spool.

It is, therefore, an object of this invention to provide an improved spool support in a camera that facilitates convenient loading and unloading of spools of sensitized material therefrom.

It is a further object of the invention to provide an improved sensitized sheet supply magazine which accurately supports a spool of sensitized material for rotation about a fixed axis.

It is a further object of the invention to provide an improved film supply magazine that is simple to manufacture, has relatively few parts, is more efficient and convenient to operate than those heretofore in use.

In accordance with the invention there is provided in a camera having a light type housing for holding sheet material wound about a cylindrical axis, a pair of spaced parallel walls perpendicular to the axis. A support surface extends perpendicularly from each of the walls for supporting sheet material for rotation about the axis. The support surface intersects a common circle having a center along the cylindrical axis and substending an arc of less than 180 degrees on the circle. There is further provided locking means coupled to the side walls for preventing substantial movement of the sheet material in a direction normal to the cylindrical axis. The locking means is resiliently displaceable in a direction transverse to the axis to allow ready insertion and removal of the sheet material from the support surface in the housing without displacing the walls.

For a better understanding of the present invention, together with other and further objects thereof, reference is made to the following description taken in connection with the accompanying drawing and its scope pointed out in the appended claims.

Figure 1:
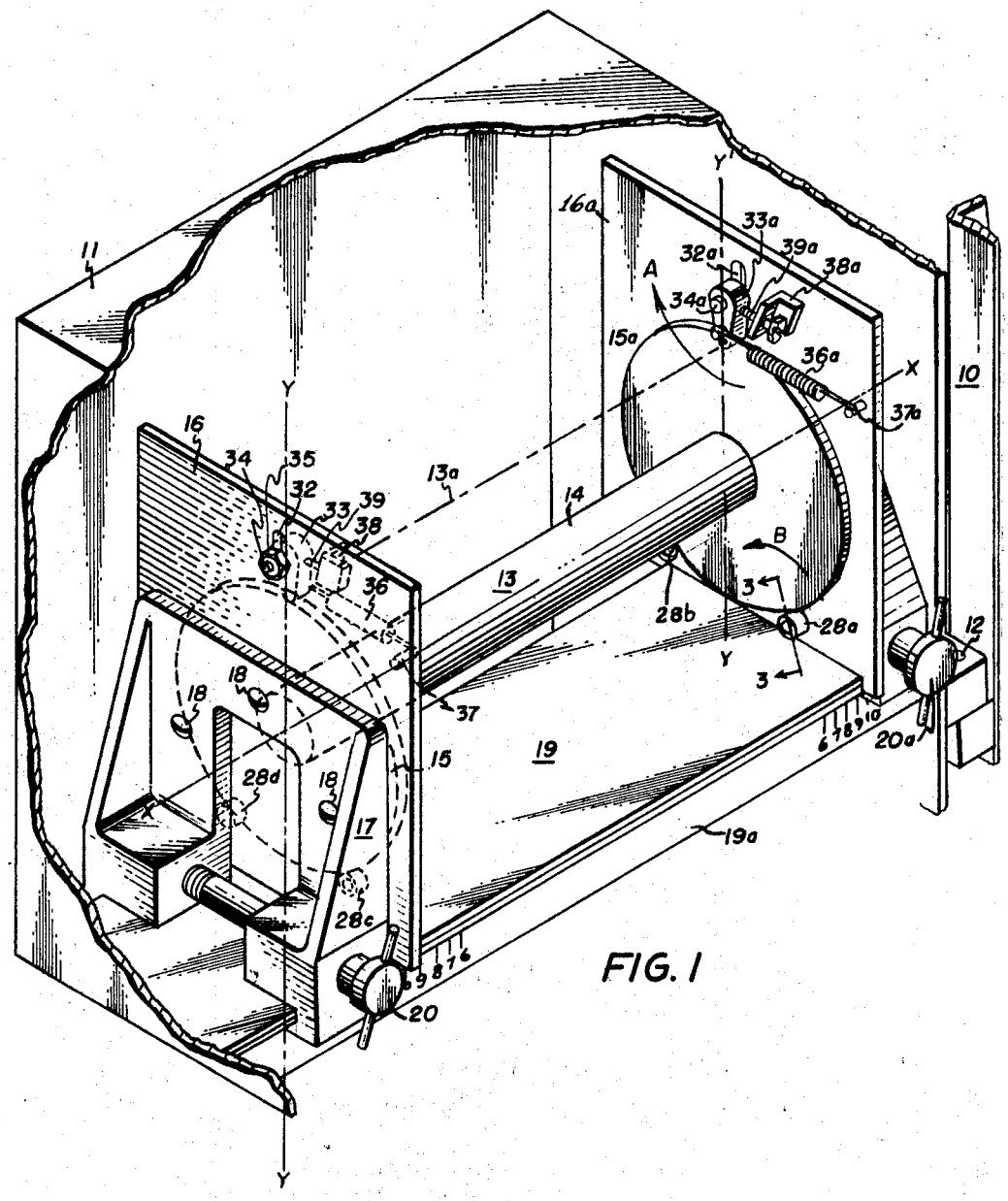
FIG. 1 is a perspective view of a sensitized sheet roll holder in a camera-processor embodying the present invention.

Referring now to the drawings, and with particular reference to FIG. 1, there is here illustrated the preferred sensitized sheet supply holder embodying the invention. In FIG. 1, the camera housing has been shown broken away and the access door for the sensitized sheet supply open for the sake of clarity.

The camera housing is generally designated at 10, and includes an access door 11, pivotally connected to the housing through hinges, one of which is shown as 12 in FIG. 1. In a camera-processor of the type shown in U.S. Patent No. 3,045,540, it is preferable that the sensitized material be stored in the access door. The processor portion of the camera-processor prevents easy access to the camera from the rear. With the door open the sensitized material may be loaded from the side of the camera-processor by the operator. While the invention will be described in terms of using sensitized paper sheet material and in the environment of a camera-processor of the type described in the above mentioned patent application and patent, it is not intended to be limited to this type of sensitized goods nor to this type of camera-processor. By way of example, the invention is equally applicable to photographic film, offset plate material, and to direct rear loading cameras.

The sensitized paper 13a (shown dotted) is cylindrically wound on spool 13. Spool 13 has a cylindrical core 14 and a pair of circular flanges 15 and 15a concentric with the cylinder 14. The cylndrical bore 14 defines a cylindrical axis indicated as X—X. The spool 13 is mounted in the access door between a pair of parallel upright supports 16 and 16a. The upright supports 16 and 16a are fastened to a pair of slideable brackets 17 and 17a, respectively, by screws 18. The bracket and upright support assembles are slideably supported on a base plate 19. The base plate 19 has a vertical flange 19a, coupled to it. The flange 19a has a series of markings thereon for indicating spacing of the uprights for varying width spools. The slideable brackets 17 and 17a may be clamped to the base plate by rotating knobs 20 and 20a. Rotation of knob 20 rotates bolt 21 for tightening the brackets 17 against the base plate 19. This will be described in more detail in connection with the description of FIG. 2.

Figure 2:
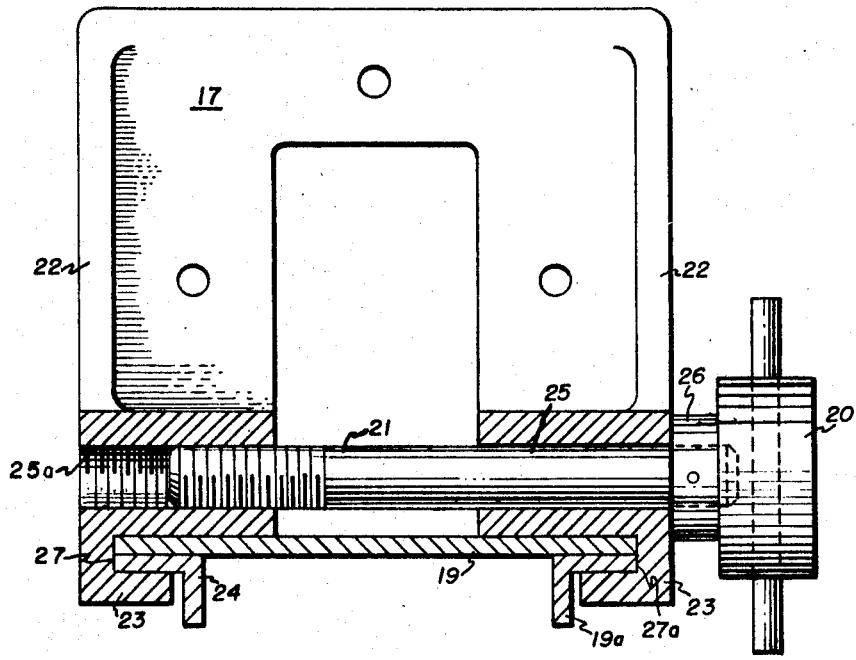
FIG. 2 is a side elevation view, partially in section, of the bracket and base plate assembly taken from the left hand side of FIG. 1.

In FIG. 2 there is here shown an elevation view of the bracket 17, partially in section, illustrating its assembly to the base plate 19. The bracket 17 has a pair of vertical legs 22 which extend below the base plate 19. The legs 22 are formed with reentrant angles 23 for engaging the base plate 19. The base plate 19 has a pair of flanges 19a and 24 recessed from its edges. The flanges may be formed by spot welding a pair of angles to the base plate, as shown. Bracket 17 in addition has two aligned apertures 25 and 25a formed therein. The aperture 25 is of sufficient diameter for the bolt 21 to freely pass therethrough on assembly. The aperture 25a is formed with engaging threads for the threaded end of bolt 21. Knob 20 is affixed to the bolt 21, whereby, rotation of the knob 20 in one direction causes the vertical legs 22 of bracket 17 to move towards each other clamping against the edges 27 and 27a of the base plate 19. Rotation of the knob in the other direction causes disengagement of the legs 22 with the edges 27 and 27a whereby the bracket 17 is slideable on the base plate 19.

While each of the upright bracket assemblies are shown as identical in structure in FIGS. 1 and 2, in some applications one of the uprights may be made fixed and only one need be slideable for receiving varying width spools. However, it is preferable that both be slideable for centering the sensitized material as it goes onto the camera focal plane. For constant width applications the uprights may have a fixed spacing.

Figures 3, 4:
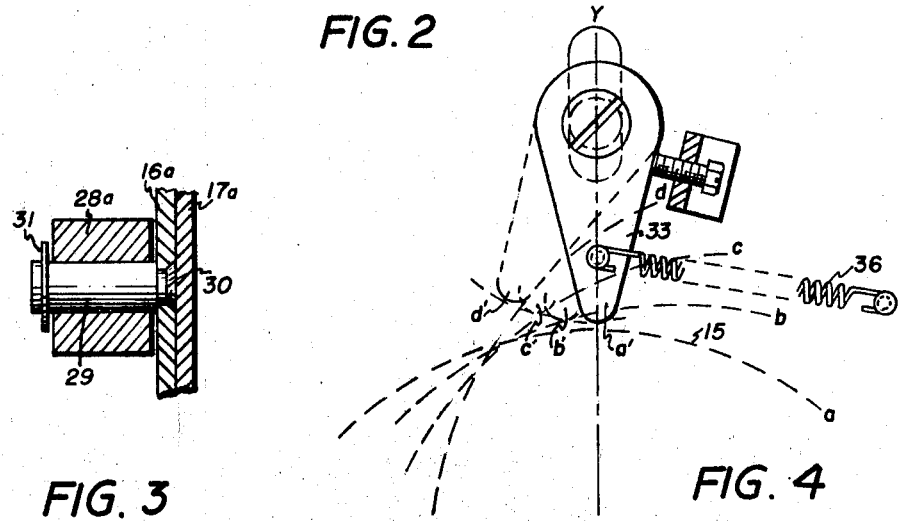
FIG. 3 is a sectional view taken along line 3—3 in FIG. 1.
FIG. 4 is an enlarged elevational view of one of the locking mechanism assemblies in FIG. 1.

Referring once again to FIG. 1, a support surface extending perpendicularly from each of the uprights 16 and 16a, is provided in the form of rollers 28a, 28b, 28c, and 28d. The contact point of the rollers 28a, 28b, 28c, and 28d and the flanges 15 and 15a define support surfaces which define a cradle for the sheet material 13a. Each pair of contact points preferably intersect a common circle that is concentric with the cylindrical axis X—X for allowing the rotation of the spool about axis X—X. In addition each pair of contact points are so spaced as to subtend an arc of less than 180 degrees on the common circle having its center on axis X—X, to facilitate loading and unloading of the spool 13. In the preferred configuration rollers 28a and 28b are symmetrically disposed about an axis Y'—Y' which is a vertical normal to axis X—X. The rollers 28c and 28d are similarly disposed about axis Y—Y. In FIG. 3 there is here illustrated a typical assembly of the rollers to the uprights. Since the assembly of all of the rollers is identical, only the assembly of roller 28a to upright 16a is here illustrated. The roller 28a is mounted on a bushing 29. The bushing 29 is fastened to the upright 16a by means of a screw 30 which is recessed in upright 16a. A retaining ring 31 which fits into a recess in bushing 29 together with upright 16a retains the roller axially. The roller 28a and bushing 29 have a sliding fit to permit rotation of the roller about the bushing, thereby minimizing friction on the spool.

Returning once again to FIG. 1, the uprights 16 and 16a each have elongated slots 32 and 32a respectively, formed therein. Locking members 33 and 33a are pivotally mounted on bolts 34 and 34a, respectively. The bolts are fastened to the uprights by means of nuts one of which is shown in FIG. 1 at 35. The elongated slots 32 and 32a allow for adjustment of the locking members 33 and 33a along the axes Y—Y and Y'—Y', respectively. It has been desirable to have this means of adjustment to compensate for manufacturing tolerances. The locking members 33 and 33a, which define a spool restraining means, prevent substantial movement of the spool 13 by engagement with the upper portions of flanges 15 and 15a, respectively. It is preferable to leave a slight clearance between the locking member and the flange to minimize loading of the spool by frictional engagement therewith. A clearance in the order of 1/64 inch has been found to be sufficient in normal operation. Springs 36 and 36a resiliently couple the locking members 33 and 33a, respectively, to uprights 16 and 16a through pins 37 and 37a. Each upright has an angle welded to it. The angles are indicated by numerals 38 and 38a in FIG. 1. The angles have threaded apertures therein, not shown, for receiving set screws 39 and 39a. The set screws engage the locking members. The set screws are used to adjust the position of the locking members with respect to the vertical normal axes Y—Y and Y'—Y'. With this construction the locking members may be pivoted about the bolts 34 and 34a in the direction of arrow A and returned to their original position by springs 36 and 36a.

The operation of the apparatus will be explained with reference to FIGS. 1 and 4. FIG. 4 is an enlarged elevation view of the locking member 33a schematically showing its motion and the motion of flange 15a. To load the spool into the camera housing the door 11 is pivotally opened by swinging the door on hinge 12. The knobs 20 and 20a are rotated in a first direction to loosen brackets 17 and 17a. The bracket and upright assembly is then set to the proper spacing as indicated on vertical flange 19a. The knobs are then rotated in the opposite direction to lock the bracket and upright assemblies in place. The spool is then loaded into the housing in a generally horizontal direction. The flanges 15 and 15a contact rollers 28c and 28a, respectively. The spool is then pivoted about these rollers in the direction of the arrow B. The edges of the flange contact the side of locking members 33 and 33a. As the spool 13 is continuously pivoted in the direction B the locking members 33 and 33a pivot about the bolts 34 and 34a, respectively, in the direction A. When the spool flanges 15 and 15a are seated on the rollers 28a, 28b, 28c, 28d the springs 36 and 36a cause the locking members 33 and 33a to return to the position indicated in FIG. 1. The extent of travel of locking members in this direction is controlled by set screws 39 and 39a. The spool is removed from the camera after opening the door by simultaneously lifting and rotating the spool until the flanges 15 and 15a frictionally engage the locking members 33 and 33a.

In FIG. 4, there is illustrated the successive positions of one of the locking members, 33, as it is rotated by one of the flanges, 15, during removal of the spool. The locking member 33a and flange 15a shown in FIG. 1 operate simultaneously with member 33 and flange 15 in the same manner as will be described hereinafter. The spool is lifted to contact the locking member 33 and simultaneously rotated in the direction of arrow C. The simultaneous rotation and lifting cause the flange 15 to be in the successive positions shown at a through d. The locking member is rotated by the flange and assumes positions a' through d' simultaneously. When the flange 15 is in position d and locking member 33 in position d', the spool may be removed in a horizontal direction through the open door. After removal the locating members 33 once again return to the position a' by means of springs 36.

Figures 5, 6:
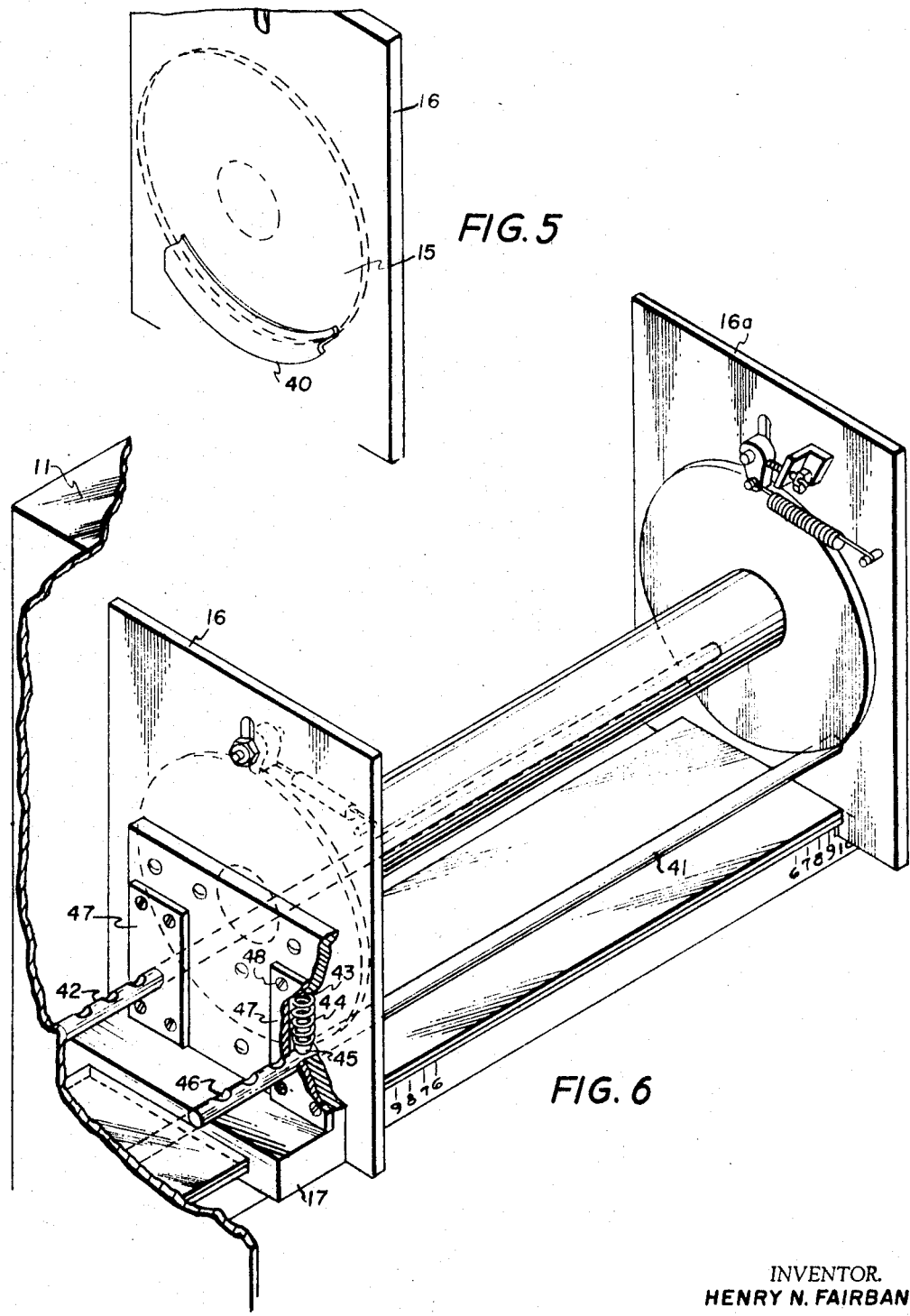
FIG. 5 is a perspective view showing another embodiment of the support surface embodying the invention.
FIG. 6 is a perspective view of still another embodiment of the invention.

Referring now to FIG. 5, there is here illustrated another embodiment of the guide surfaces of the present invention. In FIG. 5 the rollers shown in FIG. 1 have been eliminated and an arcuate guide surface 40 is affixed to the upright support 16 and supports flange 15 as shown in dotted lines. An identical structure is used in conjunction with upright support 16a.

Referring now to FIG. 6, there is here illustrated still another embodiment of the present invention. Since the device shown in FIG. 6 is generally similar to that shown in FIG. 1, corresponding elements are identical by identical reference numerals. The embodiment herein illustrated principally differs from FIG. 1 in the elimination of the rollers and their replacement by a pair of elongated rods 41 and 42 which extend between and are coupled to the vertical walls of the door 11. The uprights 16 and 16a each have apertures therein for receiving rods 41 and 42, thereby providing slidable coupling between the uprights and the rods. The bracket 17 has two recesses formed therein one of which is shown at 43. Within the recess there is mounted a spring 44 and a ball 45 which make up a resilient male detent catch. The rods 41 and 42 are formed with indentation 46, the ball is urged into contact with indentation 46 by the spring 44. The spring and ball are retained within the bracket 17 by a cover plate 47 which is held to the bracket 17 by screws 48. Each bracket has two such spring and ball assemblies, one for each rod. To adjust for varying width spools it is only necessary to move the bracket and upright assembly along the rods. Another modification that is also contemplated is that a single locking member may be used instead of two locking members shown in FIGS. 1 and 6.

While there has been described what are at present considered to be the preferred embodiments of this invention, it will be obvious to those skilled in the art that various changes and modifications may be made therein without departing from the invention, and it is, therefore, aimed in the appended claims to cover all such changes and modifications that fall within the true spirit and scope of the invention.

What is claimed is:
1. In combination:
    a light-tight housing;
    a spool for supporting photographic film wound thereon, said spool having circular flanges at the ends thereof;
    a cradle positioned within said housing for supporting said spool at lower portions of said flanges;
    spool restraining means positioned above and out of contact with the upper portion of at least one of the flanges of said spool when said spool is seated in said cradle for preventing substantial translational movement of said spool along a first line lying between said spool restraining means and the center of said circular flanges and for permitting substantial translation movement along a second line transverse to said first line;
    said spool restraining means further comprising a pivotable member;
    means for pivotably supporting said pivotable member;
    a stop member; and
    means for biasing said pivotable member against said stop member to allow said pivotable member to be displaced along said second line but not along said first line.
2. The combination as set forth in claim 1 wherein said pivotable member has a rounded terminal portion at its lower end.
3. The combination as set forth in claim 1 wherein said cradle comprises rollers for supporting lower portions of the circular flanges of said spool when said spool is seated therein.
4. The combination as set forth in claim 1 wherein said cradle comprises rods for supporting lower portions of the circular flanges of said spool when said spool is seated therein.
5. The combination as set forth in claim 1 wherein said cradle comprises a pair of arcuate guides for supporting the lower portions of the circular flanges of said spool when said spool is seated therein.
6. The combination as set forth in claim 4 wherein said rods have detent indentations formed therein and further including a resilient male detent member coacting with individual ones of said detent indentations for adjustably accommodating various spool lengths.

References Cited by the Examiner

UNITED STATES PATENTS

| 851,015 | 4/1907 | Meisel. | |
| 2,253,090 | 8/1941 | Peterson | 95—31 X |
| 2,441,439 | 5/1948 | Nelson | 242—66 X |
| 2,617,608 | 11/1952 | Carter | 242—66 |
| 2,730,310 | 1/1956 | Schultz | 242—68.7 X |
| 2,833,489 | 5/1958 | Hall | 242—78.7 X |
| 3,103,322 | 9/1963 | Garner | 242—86.5 |

FOREIGN PATENTS 1,271,124  7/1961  France.

NORTON ANSHER, *Primary Examiner.*

EVON C. BLUNK, *Examiner.*